(12) United States Patent
Tashiro

(10) Patent No.: US 9,791,754 B2
(45) Date of Patent: Oct. 17, 2017

(54) LIQUID CRYSTAL DISPLAY

(71) Applicant: Mitsubishi Electric Corporation, Tokyo (JP)

(72) Inventor: Tomohiro Tashiro, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 156 days.

(21) Appl. No.: 14/619,495

(22) Filed: Feb. 11, 2015

(65) Prior Publication Data

US 2015/0241745 A1    Aug. 27, 2015

(30) Foreign Application Priority Data

Feb. 27, 2014   (JP) ................. 2014-036213

(51) Int. Cl.

| G02F 1/1333 | (2006.01) |
| G02F 1/1362 | (2006.01) |
| G02F 1/1335 | (2006.01) |
| G02F 1/1343 | (2006.01) |
| G02F 1/1345 | (2006.01) |

(52) U.S. Cl.
CPC .. *G02F 1/136204* (2013.01); *G02F 1/133514* (2013.01); *G02F 1/134363* (2013.01); *G02F 1/136286* (2013.01); *G02F 2001/13456* (2013.01)

(58) Field of Classification Search
CPC ............ G02F 1/136204; G02F 1/1345; G02F 1/136286; G02F 1/133514; G02F 1/134363; G02F 2001/13456

USPC .......................................... 349/40
See application file for complete search history.

(56) References Cited

U.S. PATENT DOCUMENTS

| 5,870,160 A | 2/1999 | Yanagawa et al. |
| 6,034,757 A | 3/2000 | Yanagawa et al. |
| 6,108,066 A | 8/2000 | Yanagawa et al. |
| 6,346,932 B1 | 2/2002 | Maeda |
| 6,473,067 B2 | 10/2002 | Maeda |
| 6,525,786 B1 | 2/2003 | Ono |
| 6,657,608 B2 | 12/2003 | Maeda |
| RE40,770 E | 6/2009 | Maeda |
| 7,663,726 B2 | 2/2010 | Takahashi et al. |
| 7,738,244 B2 | 6/2010 | Noguchi et al. |
| 7,796,224 B2 | 9/2010 | Aota et al. |

(Continued)

FOREIGN PATENT DOCUMENTS

| JP | H06-87930 U | 12/1994 |
| JP | H08-36189 A | 2/1996 |

(Continued)

*Primary Examiner* — Nathanael R Briggs
*Assistant Examiner* — William Peterson
(74) *Attorney, Agent, or Firm* — Studebaker & Brackett PC

(57) ABSTRACT

A liquid crystal panel includes a TFT array substrate and a color filter substrate that includes a transparent conductive film (CF transparent conductive film) formed on a surface thereof. The TFT array substrate includes ground wiring that is connected to the CF transparent conductive film and supplies the CF transparent conductive film with a ground potential and CF ground checking wiring that is connected to the transparent conductive film independently of the ground wiring. The CF ground checking wiring extends along an outermost periphery portion on at least one side of the TFT array substrate.

6 Claims, 10 Drawing Sheets

(56) References Cited

U.S. PATENT DOCUMENTS

| | | |
|---|---|---|
| 8,279,146 B2 | 10/2012 | Park et al. |
| 8,724,048 B2 | 5/2014 | Nozaki |
| 8,830,409 B2 | 9/2014 | Segawa et al. |
| 2008/0007926 A1 | 1/2008 | Lee et al. |
| 2008/0062373 A1* | 3/2008 | Kim ................... G02F 1/1345 349/151 |
| 2010/0123846 A1 | 5/2010 | Kim et al. |
| 2011/0102719 A1* | 5/2011 | Kakehi ............ G02F 1/134363 349/122 |
| 2012/0133852 A1* | 5/2012 | Kim ................. G02F 1/136204 349/33 |
| 2013/0229589 A1 | 9/2013 | Won et al. |
| 2014/0375919 A1 | 12/2014 | Segawa et al. |

FOREIGN PATENT DOCUMENTS

| | | |
|---|---|---|
| JP | H10-50747 A | 2/1998 |
| JP | 2758864 B2 | 3/1998 |
| JP | H11-109395 A | 4/1999 |
| JP | H11-160727 A | 6/1999 |
| JP | 2001-005018 A | 1/2001 |
| JP | 2001-021918 A | 1/2001 |
| JP | 2001-100233 A | 4/2001 |
| JP | 2001-108958 A | 4/2001 |
| JP | 2001-147441 A | 5/2001 |
| JP | 2002-082351 A | 3/2002 |
| JP | 2006-350243 A | 12/2006 |
| JP | 2007-212610 A | 8/2007 |
| JP | 2008-021994 A | 1/2008 |
| JP | 2008-070689 A | 3/2008 |
| JP | 2008-070873 A | 3/2008 |
| JP | 2008-096475 A | 4/2008 |
| JP | 2008-145686 A | 6/2008 |
| JP | 2008-158392 A | 7/2008 |
| JP | 2008-164787 A | 7/2008 |
| JP | 2008-165179 A | 7/2008 |
| JP | 2008-203448 A | 9/2008 |
| JP | 2008-233457 A | 10/2008 |
| JP | 2009-020272 A | 1/2009 |
| JP | 2009-500655 A | 1/2009 |
| JP | 2009-031464 A | 2/2009 |
| JP | 2010-054909 A | 3/2010 |
| JP | 2010-113252 A | 5/2010 |
| JP | 2010-122675 A | 6/2010 |
| JP | 2010-127974 A | 6/2010 |
| JP | 2010-164946 A | 7/2010 |
| JP | 2010-181741 A | 8/2010 |
| JP | 2010-191097 A | 9/2010 |
| JP | 2011-022182 A | 2/2011 |
| JP | 2011-170006 A | 9/2011 |
| JP | 2011-186088 A | 9/2011 |
| JP | 2012-073473 A | 4/2012 |
| JP | 2013-011663 A | 1/2013 |
| JP | 2013-186470 A | 9/2013 |
| WO | 97/34188 A1 | 9/1997 |
| WO | 2007/004819 A1 | 1/2007 |

* cited by examiner

F I G. 1
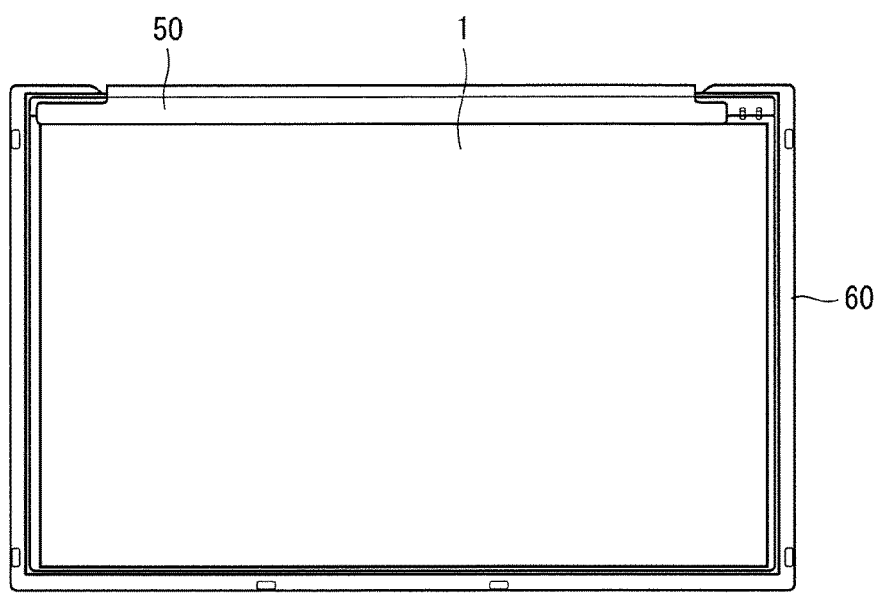

F I G. 5
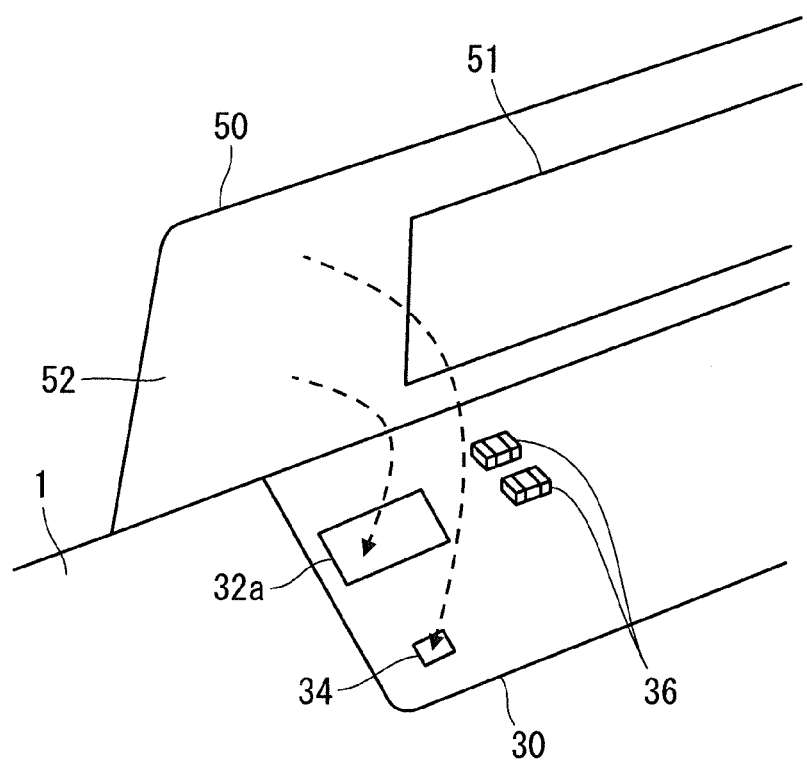

LIQUID CRYSTAL DISPLAY

BACKGROUND OF THE INVENTION

Field of the Invention

The present invention relates to a liquid crystal display, and more particularly, to a technique for improving its resistance to electrostatic discharge (ESD).

Description of the Background Art

Traditional liquid crystal displays (LCDs) have typically included a front frame that covers four sides of the front surface of a liquid crystal panel. In recent years, the LCD having a structure (no front-frame structure) that does not include a front frame is becoming increasingly common on grounds of design and mechanism.

The front frame included in the LCD is fixed to the liquid crystal panel to cover a driver IC (including a source driver IC that outputs a display signal and a gate driver IC that outputs a scan signal) that drives each pixel of the liquid crystal panel such that the drive IC can be protected from electrostatic discharge (ESD). Thus, the LCD having no front-frame structure includes, in place of the front frame, a conductive tape (hereinafter referred to as the "shielding tape") bonded to the liquid crystal panel in order to protect the driver IC from ESD. The shielding tape also protects, in many cases, the electronic components, such as peripheral circuits (including a bypasscapacitor) of the driver IC, a control circuit, and a power supply circuit if these electronic components are mounted on a FPC that is connected with the driver IC.

The shielding tape is usually bonded only to the side of the liquid crystal panel with the driver IC located thereon. When a side with no shielding tape bonded thereto is applied with ESD, ESD noise enters common potential (VCOM) wiring located on the outer periphery portion of the liquid crystal panel due to the absence of discharge path for ESD. Consequently, the given standard requirements cannot be met in some cases. To solve the problem, additional shielding tapes are bonded to the sides with no driver IC mounted thereon.

For example, as disclosed in Japanese Patent Application Laid-Open No. 2001-100233, the thin-film transistor (TFT) array substrate of the liquid crystal panel has a discharge path on each side thereof by including wiring (ground wiring) that is connected with a ground potential (GND) and extends along the outer periphery portion thereof.

If the shielding tapes are bonded to all sides of the liquid crystal panel in the LCD having no front-frame structure, the discharge paths for ESD can be secured on all sides of the liquid crystal panel. In terms of accurate positioning of the shielding tapes to be bonded, the shielding tapes should be bonded to each side one by one, which causes an increase in manufacturing cost. In addition, an increase in the number of shielding tapes to be bonded may reduce the yields because the shielding tapes are more likely to fall off.

ESD may cause problems for the LCD equipped with a front frame that has weak connection with the ground potential (GND connection) (has insufficient discharge paths provided thereto) and for applications (such as, an application used for an amusement game machine) in which the front frame itself does not have the GND connection. Similarly, ESD may cause problems in a case where the liquid crystal panels of the LCDs equipped with a front frame are diverted to those of the LCDs having no front-frame structure (in other words, in the case that the liquid crystal panels of the LCDs equipped with a front frame and the liquid crystal panels of the LCDs having no front-frame structure are standardized).

As disclosed in Japanese Patent Application Laid-Open No. 2001-100233, a discharge path for ESD is formed of the ground wiring extending on the outer periphery portion of the liquid crystal panel, so that the number of shielding tapes can be reduced. However, the applied ESD directly enters the driver IC if the discharge path for ESD is formed of the ground wiring that is connected to the driver IC. This possibly causes a display failure.

As for the liquid crystal panel employing the mode in which the liquid crystals are driven by the transverse electric field (transverse electric field mode), such as the in-plane switching (IPS) mode ("IPS" is a registered trade mark), with a view toward improving the image quality, a transparent conductive film (hereinafter referred to as the "CF transparent conductive film") made of, for example, indium tin oxide (ITO) is disposed on the surface of a color filter (CF) substrate and is connected with the ground wiring on the TFT array substrate. Such a configuration is employed because the potential change of the color filter substrate causes the display to deteriorate (causes the screen to appear greenish).

In many cases, the CF transparent conductive film and the ground wiring are connected to each other through a conductive tape made of, for example, aluminum or through conductive paste such as silver paste. To conduct a check (hereinafter referred to as the "CF ground check") on whether the CF transparent conductive film and the ground wiring are properly connected to each other, checking wiring (CF ground checking wiring) that is connected to the CF transparent conductive film is disposed, independently of the ground wiring, on the TFT array substrate and the continuity between the CF ground checking wiring and the ground wiring is tested (the resistance value is measured).

SUMMARY OF THE INVENTION

The present invention has an object to provide a liquid crystal display in which a discharge path for ESD is secured on each side of a liquid crystal panel to reduce the required number of shielding tapes and to prevent ESD from entering a driver IC.

A liquid crystal display according to the present invention includes a thin-film transistor array substrate and a color filter substrate that is located to face the thin-film transistor array substrate and includes a transparent conductive film formed on a surface thereof. The thin-film transistor array substrate includes first wiring that is connected to the transparent conductive film and supplies the transparent conductive film with a ground potential and second wiring that is connected to the transparent conductive film independently of the first wiring. The second wiring extends along an outermost periphery portion on at least one side of the thin-film transistor array substrate.

The second wiring is provided to secure the discharge path for ESD. This reduces the number of shielding tapes, thereby lowering manufacturing cost and improving yields. The discharge path for ESD formed of the second wiring (CF ground checking wiring) prevents ESD from entering the driver IC. Moreover, a check can be conducted on whether the ground wiring is connected with the transparent conductive film on the surface of the color filter substrate.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a front view of a liquid crystal display according to a first preferred embodiment;

FIG. 5 illustrates a process for bonding a shielding tape;

DESCRIPTION OF THE PREFERRED EMBODIMENTS

First Preferred Embodiment

FIG. 1 is a front view of a liquid crystal display according to a first preferred embodiment of the present invention. The liquid crystal display has no front-frame structure in which a liquid crystal panel 1 and peripheral devices (not shown) including a backlight are housed in a mold frame 60. A shielding tape 50 is bonded only to the side of the liquid crystal panel 1 on the upside. In the following description, the sides of the liquid crystal panel 1 on the left, right, upside, and downside are referred to as the "left side," the "right side," the "upper side," and the "lower side," respectively.

Figure 2:
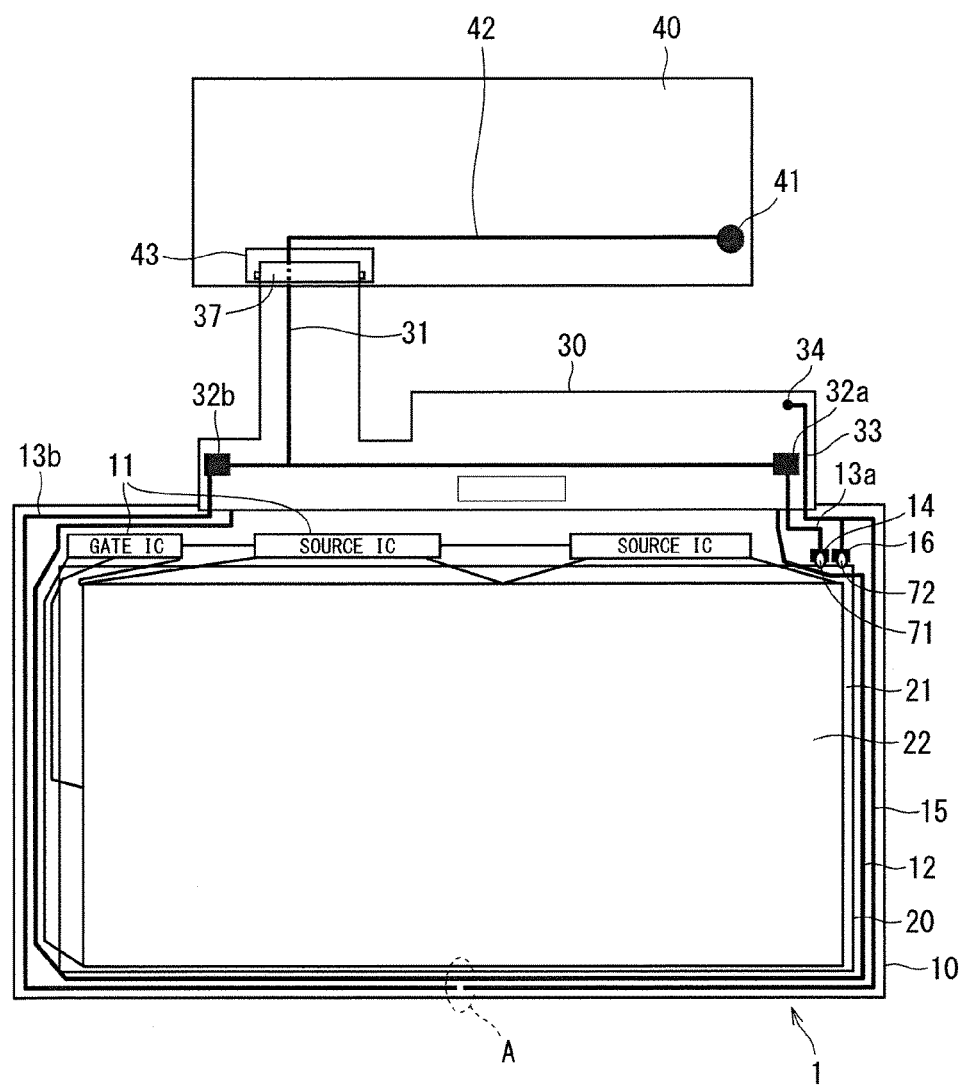
FIG. 2 illustrates configurations of a liquid crystal panel, a FPC, and a circuit board included in the liquid crystal display according to the first preferred embodiment.

FIG. 2 illustrates a configuration of the liquid crystal display according to the first preferred embodiment and shows the liquid crystal panel 1, a FPC 30, and a circuit board 40 among other constituent components of the liquid crystal display. The liquid crystal panel 1 in this preferred embodiment is driven in the transverse electric field mode.

The liquid crystal panel 1 includes a thin-film transistor array substrate 10 (hereinafter referred to as "TFT array substrate") and a color filter substrate 20 disposed to face each other with liquid crystals (not shown) sealed therebetween. The TFT array substrate 10 is slightly larger than the color filter substrate 20. Each side of the liquid crystal panel 1 corresponds to each side of the TFT array substrate 10.

The TFT array substrate 10 includes a matrix of, for example, TFTs, pixel electrodes, common electrodes that form pixels. A driver IC 11 (including a source driver IC and a gate driver IC) that drives each pixel is mounted in the vicinity of the upper side of the TFT array substrate 10.

A transparent conductive film (CF transparent conductive film) 21 is located on the surface of the color filter substrate 20 and a polarizing plate 22 is disposed on the CF transparent conductive film 21. The CF transparent conductive film 21 is supplied with a ground potential through ground wiring 13a (first wiring) on the TFT array substrate 10. CF ground checking wiring 15 (second wiring) on the TFT array substrate 10 is also connected with the CF transparent conductive film 21 independently of the ground wiring 13a.

As shown in FIG. 2, common potential wiring 12 that supplies the common electrode of each pixel with the constant potential (common potential) is disposed on the outer periphery portion of the TFT array substrate 10 to surround the display area. Ground wiring 13b (third wiring) and the CF ground checking wiring 15 extend outside of the common potential wiring 12. The ground wiring 13b and the CF ground checking wiring 15 are disposed on the outermost periphery portion of the TFT array substrate 10.

As shown in FIG. 2, the ground wiring 13b extends along the outer periphery of the left half (the left side and the left half of the lower side) of the TFT array substrate 10 and the CF ground checking wiring 15 extends along the outer periphery of the right half (the right side and the right half of the lower side) of the TFT array substrate 10. Although the ground wiring 13b and the CF ground checking wiring 15 are eventually supplied with the ground potential, the ground wiring 13b and the CF ground checking wiring 15 are not connected with each other on the TFT array substrate 10.

Figure 3:
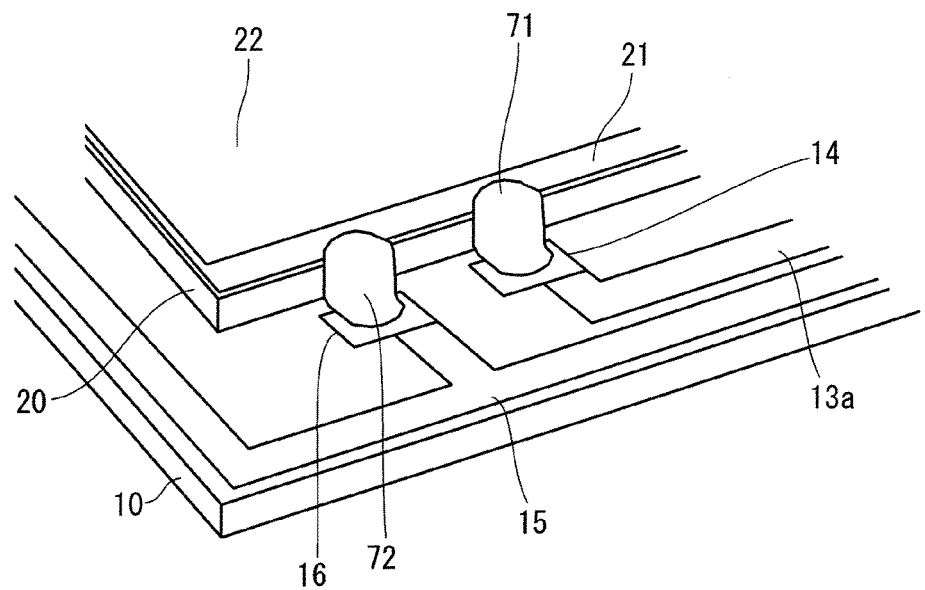
FIG. 3 is an enlarged perspective view of a connection portion in which a CF transparent conductive film is connected with ground wiring and CF ground checking wiring.

FIG. 3 is an enlarged perspective view of a connection portion in which the CF transparent conductive film 21 is connected with the ground wiring 13a and the CF ground checking wiring 15. The ground wiring 13a on the TFT transparent substrate 10 extends almost up to the color filter substrate 20. A CF connecting pad 14 for connection with the CF transparent conductive film 21 is formed on the tip of the ground wiring 13a. Conductive paste 71 is applied to bridge over the CF transparent conductive film 21 and the CF connecting pad 14, whereby the ground wiring 13a and the CF transparent conductive film 21 are electrically connected to each other.

The CF ground checking wiring 15 on the TFT array substrate 10 also extends almost up to the color filter substrate 20. A CF connecting pad 16 for connection with the CF transparent conductive film 21 is formed on the tip of the CF ground checking wiring 15. Conductive paste 72 is applied to bridge over the CF transparent conductive film 21 and the CF connecting pad 16, whereby the CF ground checking wiring 15 and the CF transparent conductive film 21 are electrically connected to each other. A conductive tape may substitute for the conductive paste 71 and 72.

The ground wiring 13a and 13b on the TFT array substrate 10 are connected to ground wiring 31 on the FPC 30. The circuit board 40 connected to the TFT array substrate 10 via the FPC 30 includes a ground pad 41 and ground wiring 42 that are supplied with the ground potential. A connector terminal portion 37 of the FPC 30 is inserted into a connector 43 of the circuit board 40, so that the ground wiring 31 on the FPC 30 and the ground wiring 13a and 13b on the TFT array substrate 10 are supplied with the ground potential.

The CF ground checking wiring 15 on the TFT array substrate 10 is connected with CF ground checking wiring 33 on the FPC 30. The CF ground checking wiring 33 on the FPC 30 includes a CF ground checking pad 34.

As illustrated in FIG. 2, the ground wiring 42, 31, and 13a, the CF connecting pad 14, the conductive paste 71, the CF transparent conductive film 21, the conductive paste 72, and the CF ground checking wiring 15 and 33 are connected in series between the ground pad 41 and the CF ground checking pad 34. A check (CF ground check) is conducted on whether the CF transparent film 21 is properly connected with the ground wiring 42, 31, and 13a by testing for continuity (measuring the resistance value) between the ground pad 41 and the CF ground checking pad 34.

To conduct the CF ground check, the electrical connection path (conduction path) between the ground wiring 13a and the CF checking wiring 15 on the TFT array substrate 10 is required to be a single path that passes through the CF transparent conductive film 21. The reason therefore is given as follows. The connection between the ground wiring 13a and the CF ground checking wiring 15 through a path other than the above allows the ground pad 41 and the CF ground checking pad 34 to be electrically continuous even if a connection failure occurs between the CF transparent conductive film 21 and the ground wiring 13a. Consequently, the connection failure cannot be detected.

Thus, the ground wiring 13a and 13b and the CF ground checking wiring 15 on the TFT array substrate 10 have separate patterns. In addition, the conductive paste 71 and the conductive paste 72 are applied separately from each other.

The ground wiring 13b is formed on the outer periphery portion of the left half (the left side and the left half of the lower side) of the TFT array substrate 10 and the CF ground checking wiring 15 is formed on the outer periphery portion of the right half (the right side and the right half of the lower side) of the TFT array substrate 10. Provided that the electrical continuity between the ground pad 41 and the CF ground checking pad 34 is confirmed by conducting the CF ground check, the ground potential is applied onto the CF ground checking wiring 15.

The wiring with the ground potential applied thereon extends along the left side, the right side, and the lower side of the liquid crystal panel 1, forming a discharge path for ESD on the three sides. In addition, the shielding tape 50 is bonded to the upper side of the liquid crystal panel 1 as shown in FIG. 1, so that the discharge path for the ESD on the upper side is formed of the shielding tape 50. Thus, all the sides have the discharge paths for ESD formed thereon, thereby providing the liquid crystal display panel 1 with high resistance to ESD. This eliminates the need for providing a shielding tape on each of the left side, the right side, and the lower side of the liquid crystal panel 1. Consequently, only one sheet of the shielding tape 50 is included, preventing an increase in manufacturing cost and a decrease in yield.

The ground wiring 13b and the CF ground checking wiring 15 that are located on the outer periphery portion of the liquid crystal panel 1 are drawn from the FPC 30 independently of the ground potential to be connected to the driver IC 11. Owing to the wiring on the FPC 30, ESD applied onto the outer periphery portion of the liquid crystal panel 1 is less likely to enter the driver IC directly.

Figure 4:
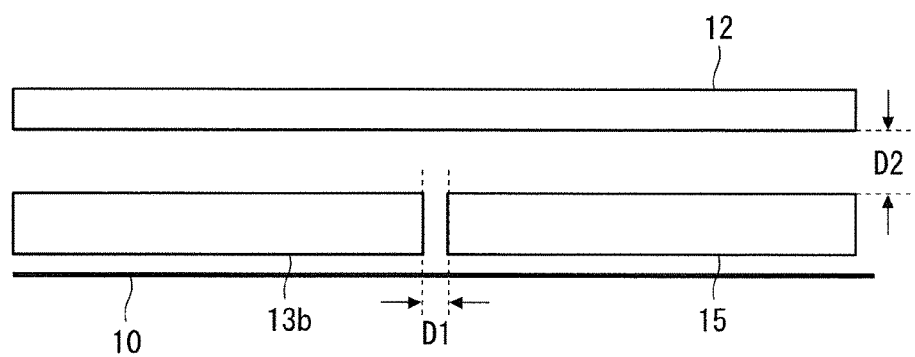
FIG. 4 illustrates a positional relationship among the ground wiring, the CF ground checking wiring, and common potential wiring on a TFT array substrate.

FIG. 4 illustrates a positional relationship among the ground wiring 13b, the CF ground checking wiring 15, and the common potential wiring 12 on the TFT array substrate 10. FIG. 4 is an enlarged view of a region A shown in FIG. 2. As shown in FIG. 2, the ground wiring 13b on the upper left portion of the TFT array substrate 10 is connected to the ground wiring 31 located on the FPC 30. The ground wiring 13b extends along the left side and the lower side of the TFT array substrate 10 up to the central part (the region A) of the lower side. The CF ground checking wiring 15 on the upper right portion of the TFT array substrate 10 is connected to the CF transparent conductive film 21 and the CF ground checking wiring 33 located on the FPC 30. The CF ground checking wiring 15 extends along the right side and the lower side of the TFT array substrate 10 up to the central part of the lower side. The ground wiring 13b and the CF ground checking wiring 15 are disposed outside of the common potential wiring 12.

As shown in FIG. 4, the ground wiring 13b and the CF ground checking wiring 15 on the TFT array substrate 10 are not connected with each other. However, the ESD noise leaps over a gap D1 between the ground wiring 13b and the CF ground checking wiring 15 if the gap is sufficiently small. Thus, the discharge path for ESD is also secured on the central portion of the lower side of the liquid crystal panel 1. The gap D1 is at least, for example, about 20 µm to 30 µm, similarly to the rule of the distance between adjacent wiring patterns according to the design of the TFT array substrate 10. Meanwhile, a gap D2 that distances the ground wiring 13a and the CF ground checking wiring 15 from the common potential wiring 12 is preferably larger than the gap D1. This can prevent the ESD noise from entering the common potential wiring 12.

FIG. 5 illustrates the process for bonding the shielding tape 50 to the liquid crystal panel 1. The FPC 30 is folded along the upper side of the liquid crystal panel 1 toward the backside of the liquid crystal panel 1, and then, the shielding tape 50 is bonded to cover the FPC 30 from the upper side over the back surface of the liquid crystal panel 1. The bonding surface of the shielding tape 50 is divided into a circuit protection insulating portion 51 that has insulating properties and no adhesion properties and a conductive adhesive portion 52 that has conductivity and adhesion properties. The circuit protection insulating portion 51 covers electronic components 36 mounted on the FPC 30.

The ground wiring 31 on the FPC 30 includes ground wiring pads 32a and 32b located at the positions that are in contact with the conductive adhesive portion 52 of the shielding tape 50 bonded to the liquid crystal panel 1. Similarly, the CF ground checking pad 34 is formed on the position that is in contact with the conductive adhesive portion 52 of the shielding tape 50.

Thus, the ground wiring 31 and the CF ground checking wiring 33 and 15 with the shielding tape 50 bonded thereto are electrically connected through the shielding tape 50. This additional connection reduces the resistance of the discharge path for ESD, providing the liquid crystal panel 1 with the further improved resistance to ESD. The additional connection has another effect in keeping the CF ground checking wiring 15 at the ground potential even if a connection failure between the CF transparent conductive film 21 and the CF ground checking wiring 15 occurs after the liquid crystal display is assembled.

Figure 6:
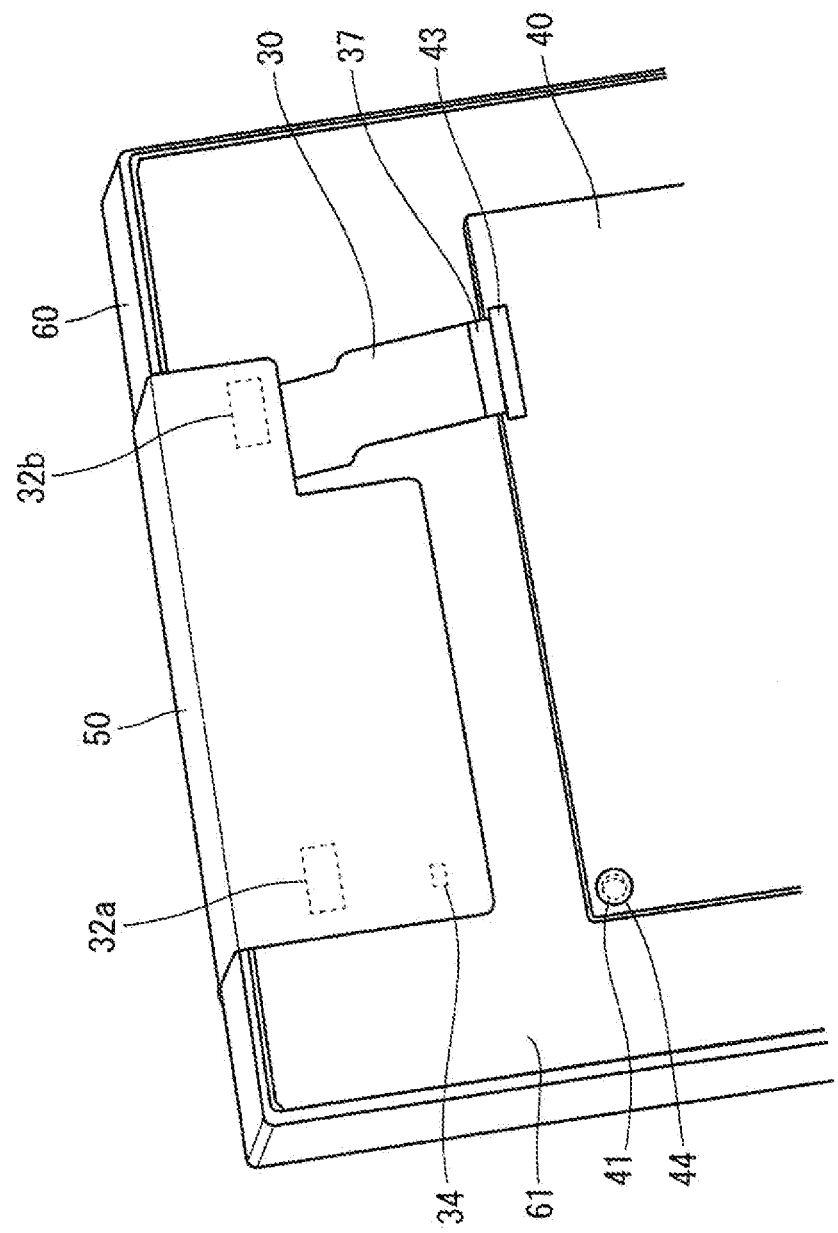
FIG. 6 illustrates a configuration of a back surface of the liquid crystal display with the shielding tape bonded thereto.

FIG. 6 illustrates the back-surface side of the liquid crystal panel 1 after the shielding tape 50 is bonded to the liquid crystal panel 1. The shielding tape 50 is connected, via the conductive adhesive portion 52, to a housing 61 (hereinafter referred to as "backlight rear metal") made of metal that houses the backlight exposed on the backside of the liquid crystal panel 1. The circuit board 40 is fixed to the backlight rear metal 61 by a screw 44 made of metal.

In the example shown in FIG. 6, a through-hole (ground electric hole) provided in the ground pad 41 serves as the screw hole of the circuit board 40 into which the screw 44 is inserted. This configuration allows the ground wiring pads 32a and 32b and the CF ground checking pad 34 that are located on the FPC 30 to be electrically connected with the ground pad 41 on the circuit board 40 through the path that passes through the shielding tape 50, the backlight rear metal 61, and the screw 44. This additional connection can provide the liquid crystal panel 1 with the further improved resistance to ESD. Moreover, ESD applied onto the ground wiring 13b and the CF ground checking wiring 15 can be discharged from the ground wiring pads 32a and 32b and the CF ground checking pad 34 to the backlight rear metal 61. This further enhances the effect in preventing ESD applied onto the outer periphery portion of the liquid crystal panel 1 from entering the driver IC directly.

Besides the screw, a boss or a gasket having conductivity and elasticity, or other means may be used to fix the circuit board 40 to the backlight rear metal 61 of the liquid crystal panel 1. Although FIG. 6 shows, as an example, the circuit board 40 incorporated into the liquid crystal display, the circuit board 40 may be incorporated into the system outside of the liquid crystal display.

[Modification]

In the example shown in FIG. 2, the ground wiring 13b is located on the outer periphery portion of the left half of the liquid crystal panel 1 and the CF ground checking wiring 15 is located on the outer periphery portion of the right half of the liquid crystal panel 1. That is, the center (the region A) of the TFT array substrate 10 serves as the boundary between the region having the ground wiring 13b extending therein and the region having the CF ground checking wiring 15 extending therein. Alternatively, the boundary may be located at a different position. In another configuration, the ground wiring 13b extends only along the left side of the liquid crystal panel 1 and the CF ground checking wiring 15 extends along the entirety of the right side and the lower side of the liquid crystal panel 1. In still another configuration, the ground wiring 13b extends along the entirety of the left side and the lower side of the liquid crystal panel 1 and the CF ground checking wiring 15 extends only along the entirety of the right side of the liquid crystal panel 1. Thus, the CF ground checking wiring 15 is required to be located on the outer periphery portion on at least one side of the TFT array substrate 10.

Figure 7:
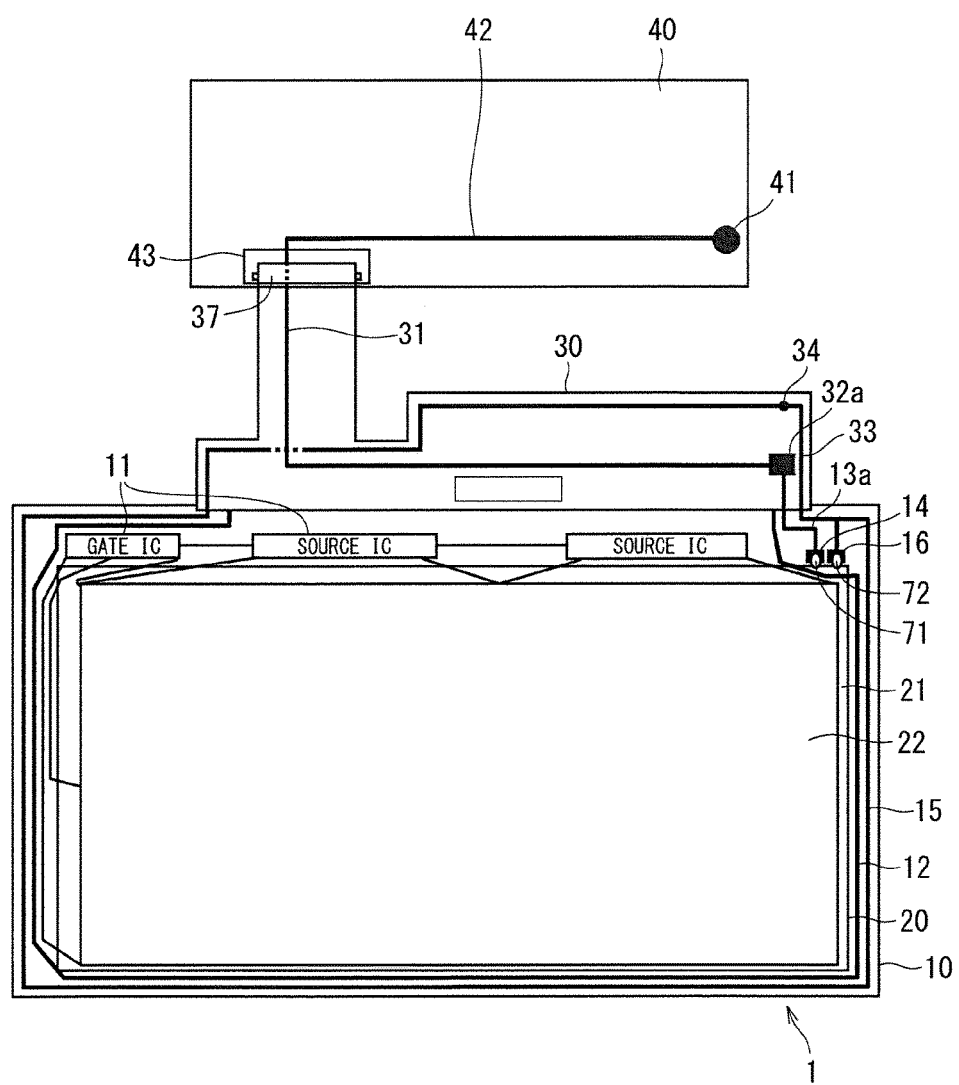
FIG. 7 illustrates configurations of the liquid crystal panel, the FPC, and the circuit board included in the liquid crystal display according to a modification of the first preferred embodiment.

As shown in FIG. 7, the CF ground checking wiring 15 and 33 may form a loop on the TFT array substrate 10 and the FPC 30 (the ground wiring 13b is not provided on the outer periphery portion of the TFT array substrate 10). That is, as shown in FIG. 7, the CF ground checking wiring 15 on the TFT array substrate 10 continuously extends along the right side, the lower side, and the left side of the TFT array substrate 10 and the both ends of the CF ground checking wiring 15 are connected to each other through the CF ground checking wiring 33 on the FPC 30.

Note that, in the configuration shown in FIG. 7, the region (GND region) of the FPC 30 to be fixed to the ground potential decreases as the region of the FPC 30 serving as the CF ground checking wiring 33 increases, whereby the problem in terms of the electro-magnetic compatibility (EMC) is more likely to occur.

Unlikely to the configuration shown in FIG. 7, the configuration in which the ground wiring 13b is located on the left side of the TFT array substrate 10 as shown in FIG. 2 has the following advantages.

The connector terminal portion 37 of the FPC 30 and the connection terminal formed on the connection portion between the FPC 30 and the TFT array substrate 10 are coated with gold plating. The methods for gold plating include the electroless plating method and the electroplating method. In general, the electroplating method is employed for the FPC 30 connected to the liquid crystal panel 1 because the electroplating method has the properties that are more favorable in terms of folding. According to the electroplating method, the connection terminal to be plated needs to be supplied with electricity, requiring a lead that extends from the connection terminal up to the end portion of the FPC 30.

Figure 8:
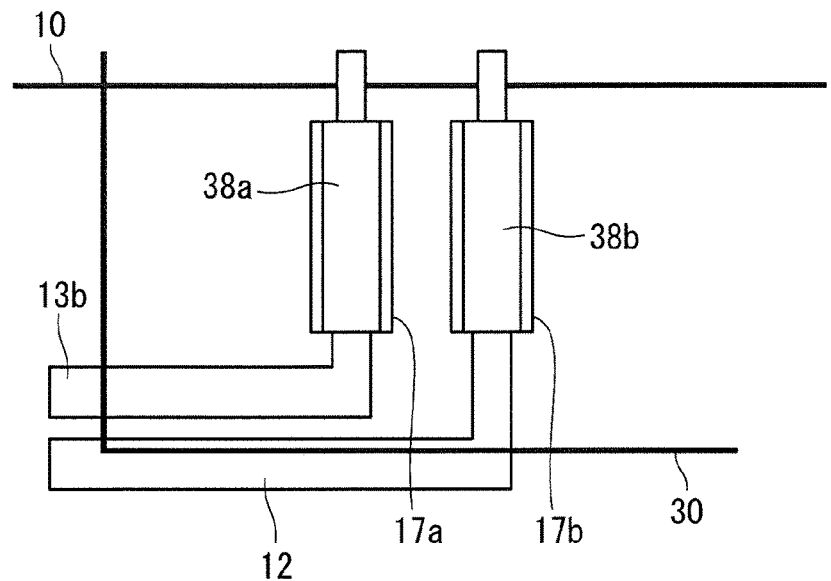
FIG. 8 is an enlarged view of a connection portion between the FPC and the TFT array substrate of the liquid crystal display according to the first preferred embodiment.

FIG. 8 is an enlarged view of the connection portion between the FPC 30 and the TFT array substrate 10 included in the configuration shown in FIG. 2. FIG. 8 shows the portion in which a connection terminal 17a of the ground wiring 13b and a connection terminal 17b of the common potential wiring 12 on the TFT array substrate 10 are connected with connection terminals 38a and 38b on the FPC 30. In the configuration shown in FIG. 2, the connection terminal 38a that is located on the FPC 30 and is connected to the ground wiring 13b on the TFT array substrate 10 is linked to the ground wiring 31 on the FPC 30, whereby the lead can be drawn on the connector terminal portion 37 side. This provides the processing for allowing the terminals not to reach the FPC outline, i.e., the processing for locating the connection terminal 38a apart from the end portion of the FPC 30 as shown in FIG. 8.

Figure 9:
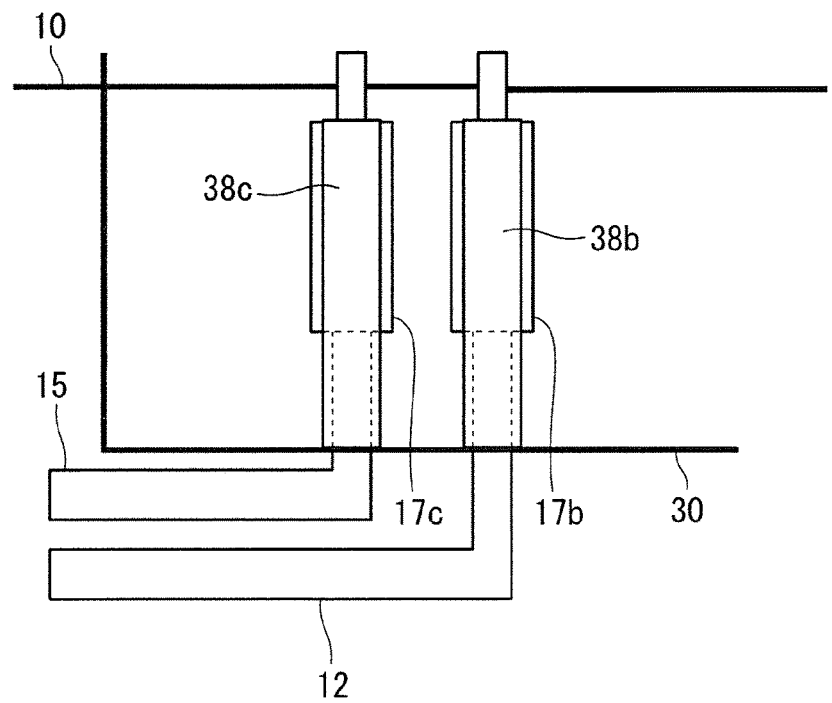
FIG. 9 is a view describing a point to note in the modification of the first preferred embodiment.
Figure 10:
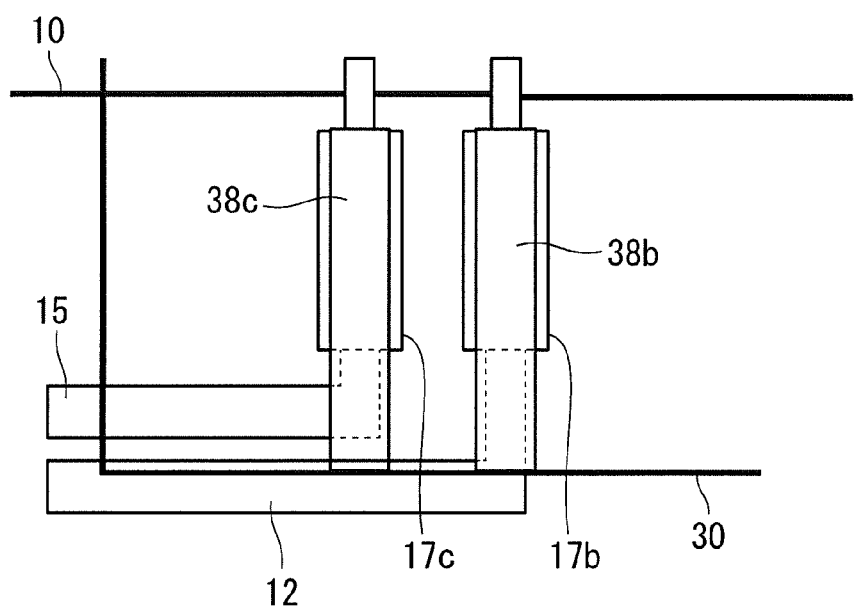
FIG. 10 is a view describing the point to note in the modification of the first preferred embodiment.

FIG. 9 is an enlarged view of the connection portion between the FPC 30 and the TFT array substrate 10 included in the configuration shown in FIG. 7. FIG. 9 shows the portion in which a connection terminal 17c of the CF ground checking wiring 15 and the connection terminal 17b of the common potential wiring 12 on the TFT array substrate 10 are connected with a connection terminal 38c and the connection terminal 38b on the FPC 30. In the configuration shown in FIG. 7, the connection terminal 38c that is located on the FPC 30 and is connected to the CF ground checking wiring 15 on the TFT array substrate 10 is not connected to the wiring linked to the connector terminal portion 37. Thus, the lead cannot be drawn on the connector terminal portion 37 side. Consequently, the connection terminal 38c is required to extend up to the end portion of the FPC 30 to allow the lead to be drawn. If the CF ground checking wiring 15 drawn from the connection terminal 17c on the TFT array substrate 10 is short as shown in FIG. 10, the connection terminal 38c on the PFC 30 is likely to cause a short circuit between the CF ground checking wiring 15 and the common potential wiring 12 located adjacent thereto. To avoid such a short circuit, the CF ground checking wiring 15 drawn from the connection terminal 17c on the TFT array substrate 10 is required to be long enough as shown in FIG. 9, hindering the size reduction of the TFT array substrate 10.

Thus, compared to the configuration shown in FIG. 7, the configuration shown in FIG. 2 has the advantage in terms of contribution to the miniaturization of the TFT array substrate 10.

Figure 11:
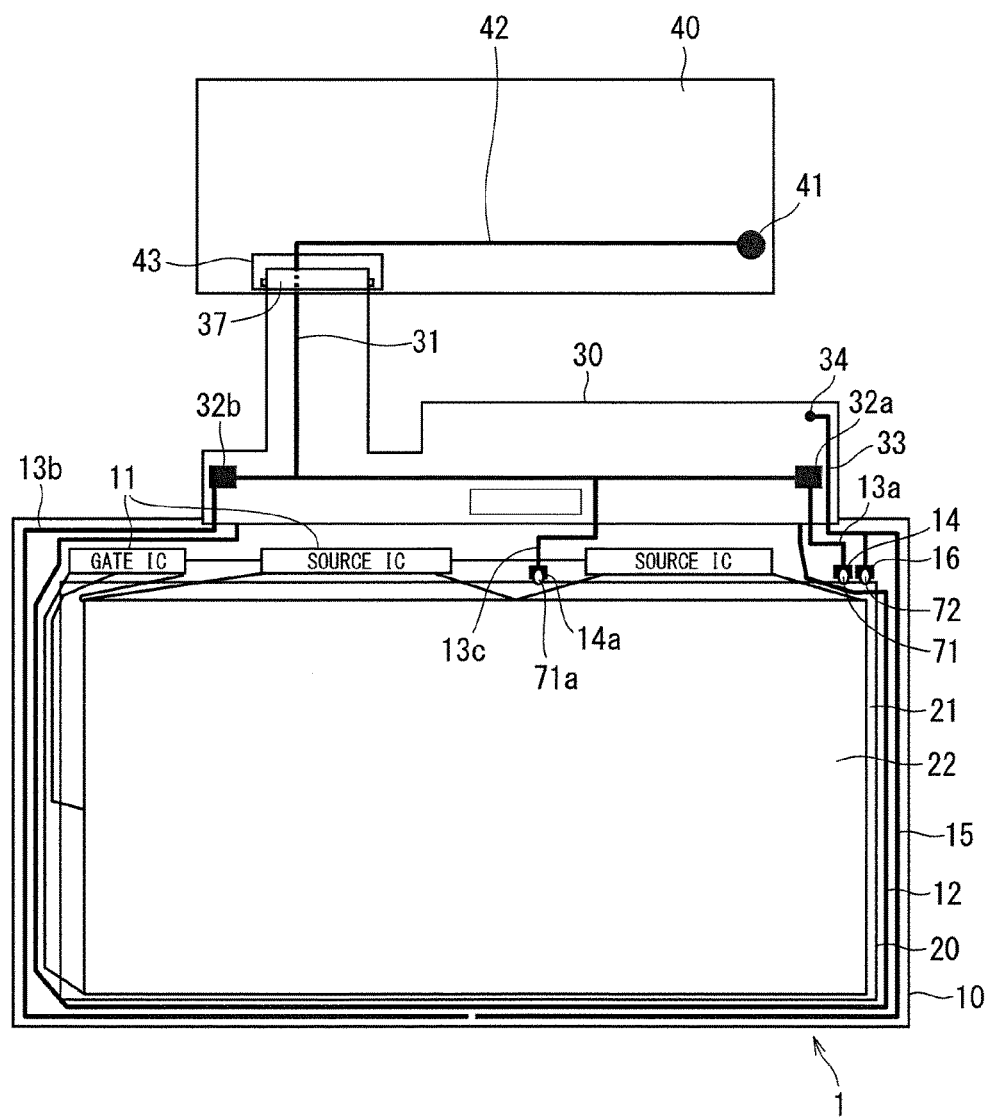
FIG. 11 illustrates configurations of the liquid crystal panel, the FPC, and the circuit board included in the liquid crystal display according to the modification of the first preferred embodiment.

Although a single connection point is provided between the CF transparent conductive film 21 and the ground wiring in the example shown in FIG. 2, a plurality of connection points may be provided. FIG. 11 illustrates, as an example, the configuration in which the CF transparent conductive film 21 is connected with the ground wiring at two points. Unlikely to the configuration shown in FIG. 2, this configuration includes ground wiring 13c, a CF connecting pad 14a, and conductive paste 71a that are located on the central part of the upper side of the TFT array substrate 10 and form connection with the CF transparent conductive film 21. This configuration provides the effect similar to that of the configuration in FIG. 2, and at the same time, allows the CF transparent conductive film 21 to be more reliably fixed to the ground potential.

Second Preferred Embodiment

Figure 12:
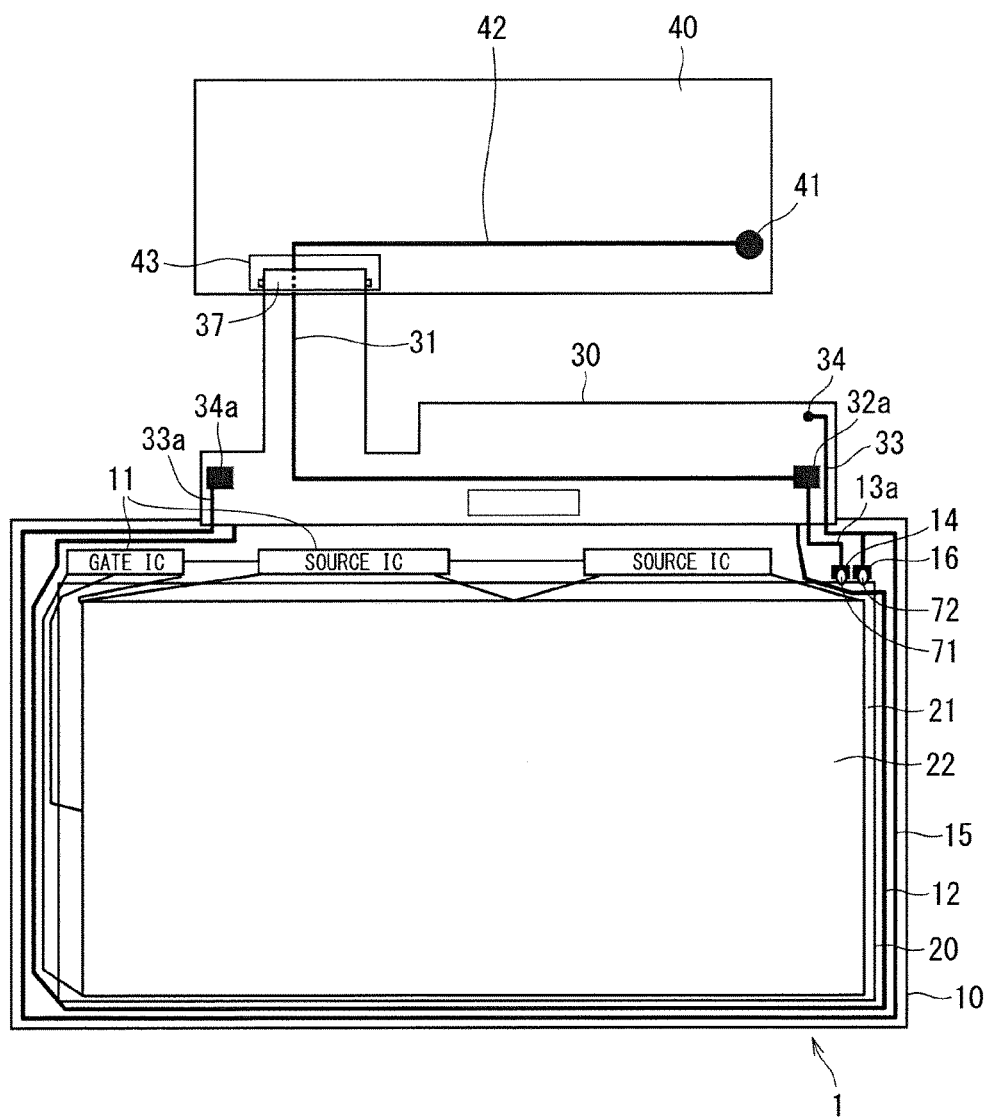
FIG. 12 illustrates configurations of the liquid crystal panel, the FPC, and the circuit board included in the liquid crystal display according to a second preferred embodiment.

FIG. 12 illustrates a configuration of the liquid crystal display according to a second preferred embodiment and shows the liquid crystal panel 1, the FPC 30, and the circuit board 40 among other constituent components of the liquid crystal display.

According to the second preferred embodiment, the CF ground checking wiring 15 on the TFT array substrate 10 extends continuously along the right side, the lower side, and the left side of the TFT array substrate 10 (the ground wiring 13b is not disposed on the outer periphery portion of the TFT array substrate 10). The right-hand end portion of the CF ground checking wiring 15 on the TFT array substrate 10 is connected to, as in FIG. 2, the CF ground checking wiring 33 and the CF ground checking pad 34 on the FPC 30. Meanwhile, the left-hand end portion of the CF ground checking wiring 33 is connected to CF ground checking wiring 33a and a CF ground checking pad 34a on the FPC 30.

The CF ground checking pad 34a on the FPC is not connected with the ground wiring 31 but is located at the position that is in contact with the conductive adhesive portion 52 of the shielding tape 50. Thus, the CF ground checking pas 34 with the shielding tape 50 bonded thereto is electrically connected to the ground wiring pad 32a of the ground wiring 31 through the shielding tape 50.

The CF ground check can be conducted by testing for continuity between the CF ground checking pad 34a and the ground pad 41 on the circuit board 40 prior to the bonding of the shielding tape 50. In a case where a plurality of the CF ground checking pads are provided on the FPC 30, the formation region therefore should be reserved on the FPC 30.

The description has been given assuming that the TFT array substrate 10 of the liquid crystal panel 1 is slightly larger than the color filter substrate 20 in the first and second preferred embodiments. Alternatively, the sides of the TFT array substrate 10 except for the upper side having the driver IC 11 mounted thereon, in other words, the left side, the right side, and the lower side of the TFT array substrate 10 may have the same length as each side of the color filter substrate 20 (so-called flush structure). In this case, the left side, the right side, and the lower side of the TFT array substrate 10 are covered with the color filter substrate 20, promising improvement of the resistance to ESD.

In the present invention, the above preferred embodiments can be arbitrarily combined, or each preferred embodiment can be appropriately varied or omitted within the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display comprising:
a thin-film transistor array substrate; and
a color filter substrate located to face said thin-film transistor array substrate, having a first surface facing said thin-film transistor array substrate and a second surface opposite to said first surface, and including a transparent conductive film formed on said second surface,
wherein said thin-film transistor array substrate includes:
first wiring that is connected to said transparent conductive film and supplies said transparent conductive film with a ground potential; and
second wiring that is connected to said transparent conductive film independently of said first wiring, said second wiring extending along an outermost periphery portion on at least one side of said thin-film transistor array substrate.

2. The liquid crystal display according to claim 1, wherein said thin-film transistor array substrate and said color filter substrate have, as a conduction path between said first wiring and said second wiring, a conduction path alone that passes through said transparent conductive film.

3. The liquid crystal display according to claim 1, wherein said thin-film transistor array substrate further includes, on a part of an outermost periphery portion thereof in which said second wiring does not extend, third wiring supplied with the ground potential.

4. The liquid crystal display according to claim 3, wherein said thin-film transistor array substrate further includes common potential wiring that is formed on an outer periphery portion of said thin-film transistor array substrate and is connected to a common electrode of each pixel, and
said second wiring and said third wiring are located outside of said common potential wiring.

5. The liquid crystal display according to claim 4, wherein a gap between said second wiring and said third wiring is smaller than a gap between said common potential wiring and said second wiring or said third wiring.

6. The liquid crystal display according to claim 1, wherein a shielding tape having conductivity is bonded to at least one side of said liquid crystal display, and
said second wiring is supplied with the ground potential through said shielding tape.

* * * * *